US008457831B2

(12) United States Patent
Oakley et al.

(10) Patent No.: US 8,457,831 B2
(45) Date of Patent: Jun. 4, 2013

(54) POWER DOOR SAFETY LOCKING SYSTEM

(75) Inventors: Mike Oakley, Plain City, OH (US); Scott Whitten, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 363 days.

(21) Appl. No.: 12/835,785

(22) Filed: Jul. 14, 2010

(65) Prior Publication Data

US 2012/0016550 A1 Jan. 19, 2012

(51) Int. Cl.
*G08C 19/00* (2006.01)
*B60J 5/06* (2006.01)

(52) U.S. Cl.
USPC .................................... 701/29; 49/26; 49/360

(58) Field of Classification Search
USPC ................. 701/29; 49/26, 360; 318/452, 445, 318/466
See application file for complete search history.

(56) References Cited

U.S. PATENT DOCUMENTS

| | | | | |
|---|---|---|---|---|
| 4,640,050 | A | 2/1987 | Yamagishi et al. | |
| 5,263,762 | A | 11/1993 | Long et al. | |
| 5,436,539 | A * | 7/1995 | Wrenbeck et al. | 318/265 |
| 5,605,363 | A | 2/1997 | Kapes | |
| 6,091,162 | A | 7/2000 | Williams, Jr. et al. | |
| 6,125,583 | A | 10/2000 | Murray et al. | |
| 6,321,488 | B1 | 11/2001 | Bigoszewski et al. | |
| 6,951,140 | B2 * | 10/2005 | Ogino et al. | 73/849 |
| 7,127,848 | B2 * | 10/2006 | Okada et al. | 49/28 |
| 7,135,787 | B2 * | 11/2006 | Alexandropoulos | 307/10.4 |
| 7,212,897 | B2 * | 5/2007 | Suzuki et | 701/49 |
| 7,269,924 | B2 * | 9/2007 | Otomo et al. | 49/506 |
| 7,690,156 | B2 * | 4/2010 | Imai et al. | 49/360 |
| 7,774,268 | B2 * | 8/2010 | Bradley | 705/38 |
| 7,810,864 | B2 * | 10/2010 | Shimizu | 296/146.4 |
| 7,814,704 | B2 * | 10/2010 | Suzuki et al. | 49/26 |
| 7,830,107 | B2 * | 11/2010 | Inoue et al. | 318/470 |
| 7,958,672 | B2 * | 6/2011 | Ishihara | 49/26 |
| 7,982,589 | B2 * | 7/2011 | Naito et al. | 340/426.28 |
| 8,022,653 | B2 * | 9/2011 | Oxle et al. | 318/460 |
| 8,032,285 | B2 * | 10/2011 | Li | 701/49 |
| 8,228,166 | B2 * | 7/2012 | Eberhard | 340/5.72 |
| 8,333,035 | B2 * | 12/2012 | Nabetani et al. | 49/26 |
| 2002/0157313 | A1 * | 10/2002 | Fukazawa et al. | 49/26 |

(Continued)

FOREIGN PATENT DOCUMENTS

| | | | |
|---|---|---|---|
| JP | 2000071975 | A * | 3/2000 |
| JP | 2002030845 | A * | 1/2002 |
| JP | 2009050472 | A * | 3/2009 |

OTHER PUBLICATIONS

International Search Report and Written Opinion of PCT/US2011/040170 dated Oct. 13, 2011.

*Primary Examiner* — Tuan C. To
(74) *Attorney, Agent, or Firm* — Rankin, Hill & Clark LLP

(57) ABSTRACT

A safety locking system is provided to detect an open fault or a ground fault condition. The safety locking system includes a central processing unit with an input and an output, and a safety switch electrically connected to the input of the central processing unit. The input receives a low signal when the safety switch is in an enabled state and a pulsed signal when the safety switch is in a disabled state. The central processing unit detects an open fault condition when the input receives a high signal for a time period greater than a threshold time period, and a ground fault condition when the input receives the low signal and the safety switch operates as if the safety switch is in the disabled state.

18 Claims, 6 Drawing Sheets

U.S. PATENT DOCUMENTS

2003/0025470 A1* 2/2003 Fitzgibbon et al. ............ 318/66
2005/0073141 A1 4/2005 Baird et al.
2005/0179409 A1* 8/2005 Honma et al. .................. 318/62
2006/0283089 A1* 12/2006 Ishihara et al. ................ 49/360
2007/0126561 A1 6/2007 Breed
2007/0266635 A1* 11/2007 Sugiura et al. .................... 49/27
2008/0022736 A1 1/2008 Kouzuma
2009/0206784 A1* 8/2009 Inoue et al. .................. 318/434
2010/0263287 A1* 10/2010 Nakano .......................... 49/360
2010/0315229 A1* 12/2010 Shin ............................. 340/540

* cited by examiner

| Safety Switch Status | Open Fault Condition | | Enabled (Or Ground Fault Condition) | | Disabled | |
|---|---|---|---|---|---|---|
| Mechanical Safety Lock Status | Engaged | Disengaged | Engaged | Disengaged | Engaged | Disengaged |
| Sliding Door Operation | No Operation | Automatically Operate After Manually Cycling Inner Handle | No Operation | Automatically Operate After Manually Cycling Inner Handle | X | No Operation |

*Fig. 2E*

POWER DOOR SAFETY LOCKING SYSTEM

BACKGROUND

The present disclosure relates generally to a vehicle power door and more particularly to a power door safety locking system.

It is known to equip vehicles with one or more sliding doors on one or both sides to facilitate trouble-free loading and unloading of goods and/or passengers. Automated mechanisms can be employed to open and close the sliding doors. As these vehicles are sometimes used to transport children, safety locking mechanisms, known as child safety locks, have been devised to prevent unwanted door unlocking and/or opening. A known safety locking mechanism is shorted to ground when the safety locking mechanism is in the "ON" position and open circuited when the safety locking mechanism is in the "OFF" position. This approach, however, is not failsafe. In other words, if there is a ground fault or an open fault in the safety locking mechanism then undesirable operations with the sliding door can occur.

For example, in the event of an open fault the door functions as if the safety locking mechanism is disabled regardless if the safety locking mechanism is in an enabled or disabled position. As a result, the door can open or close via an inner handle or a rear switch. Conversely, in the event of a ground short, the door can be disabled even though the safety locking mechanism appears to be disabled. As a consequence, the user is not able to exit the vehicle using either the inner handle or the rear switch regardless of the position of the safety locking mechanism.

SUMMARY

In accordance with one aspect, a safety locking system is provided that includes a central processing unit having an input and an output, the input to receive a low signal, a high signal, or a pulsed signal oscillating between the low signal and the high signal, and a safety switch electrically connected to the input of the central processing unit, the safety switch having an enabled state and a disabled state. The input receives the low signal when the safety switch is in the enabled state and the pulsed signal when the safety switch is in the disabled state. The central processing unit detects an open fault condition when the input receives the high signal for a time period greater than a threshold time period, and a ground fault condition when the input receives the low signal and the safety switch operates as if the safety switch is in the disabled state.

In accordance with another aspect, a power door assembly for a vehicle is provided and includes a power door, a first latch to latch the power door in a closed position, an inner handle to manually disengage the power door from the first latch, an inner handle switch activated by the inner handle to electrically disengage the power door from the first latch, a rear switch to electrically disengage the power door from the first latch when activated, and a safety locking system. The safety locking system includes a central processing unit having an input and an output, the input to receive a low signal, a high signal, or a pulsed signal oscillating between the low signal and the high signal, and a safety switch electrically connected to the input of the central processing unit, the safety switch having an enabled state and a disabled state. The input receives the low signal when the safety switch is in the enabled state and the pulsed signal when the safety switch is in the disabled state. The central processing unit detects an open fault condition when the input receives the high signal for a time period greater than a threshold time period, and a ground fault condition when the input receives the low signal and the power door moves from the closed position to an open position when the inner handle switch is activated.

In accordance with yet another aspect, a method of detecting a fault condition includes enabling or disabling a safety switch of a safety locking system, detecting a low signal when the safety switch is enabled or a pulsed signal when the safety switch is disabled at an input of a central processing unit of the safety locking system, activating an inner handle switch or a rear switch of a power door assembly, preventing a power door from moving from a closed position to an open position if the safety switch is enabled or moving the power door from the closed position to the open position if the safety switch is disabled, detecting a high signal for a time period longer than a threshold time period or detecting a low signal at the input of the central processing unit and moving the power door from the closed position to the open position, and detecting a fault condition in the safety locking system.

BRIEF DESCRIPTION OF THE DRAWINGS

FIG. 2E is a table illustrating the operation of the example embodiment of FIG. 2A.

DETAILED DESCRIPTION

Figure 1:
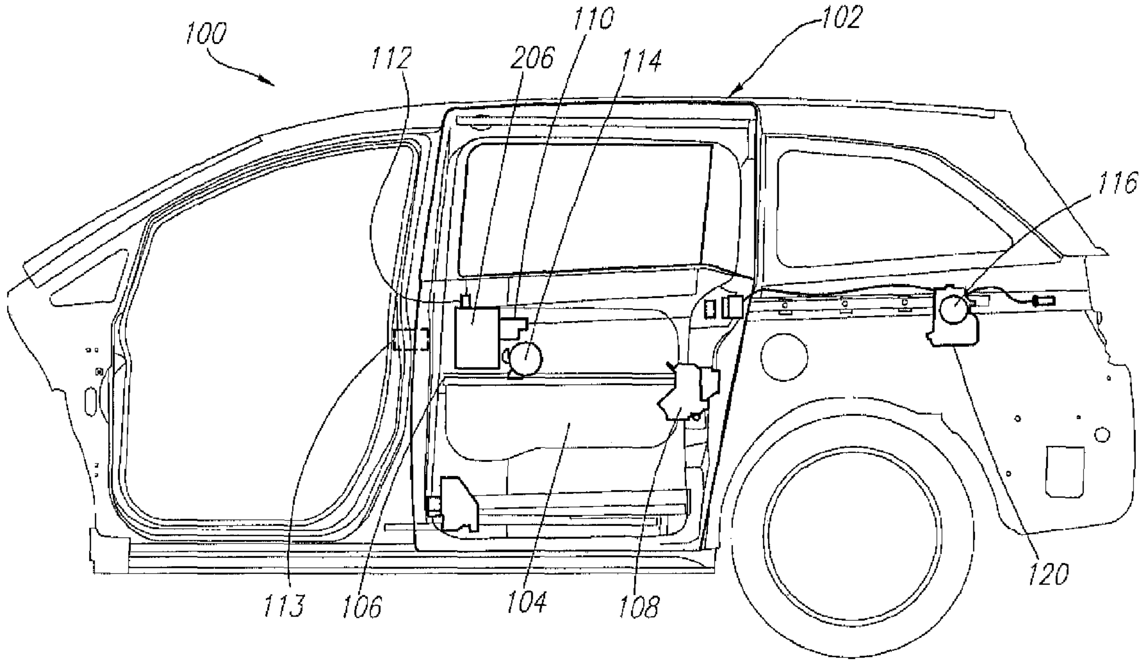
FIG. 1 is a side view of a vehicle incorporating a power door safety locking system.

Referring now to the drawings, wherein the showings are for purposes of illustrating one or more embodiments only and not for purposes of limiting the same, FIG. 1 shows a side profile of a vehicle 100 such as a minivan or cross-over type vehicle that includes a power door assembly 102 with an electronic control unit (ECU) 120 and a power door safety locking system (hereinafter "safety locking system") 200. It should be noted that the present disclosure can be employed on any type of vehicle that includes a power operated door having a safety locking system. Further, the door can be any type of vehicle door, such as but not limited to a sliding door or a hinged type door. In the embodiment described herein and shown in the figures, a sliding door is used for illustrative purposes only and is not intended to limit the scope of the invention.

Figure 4:
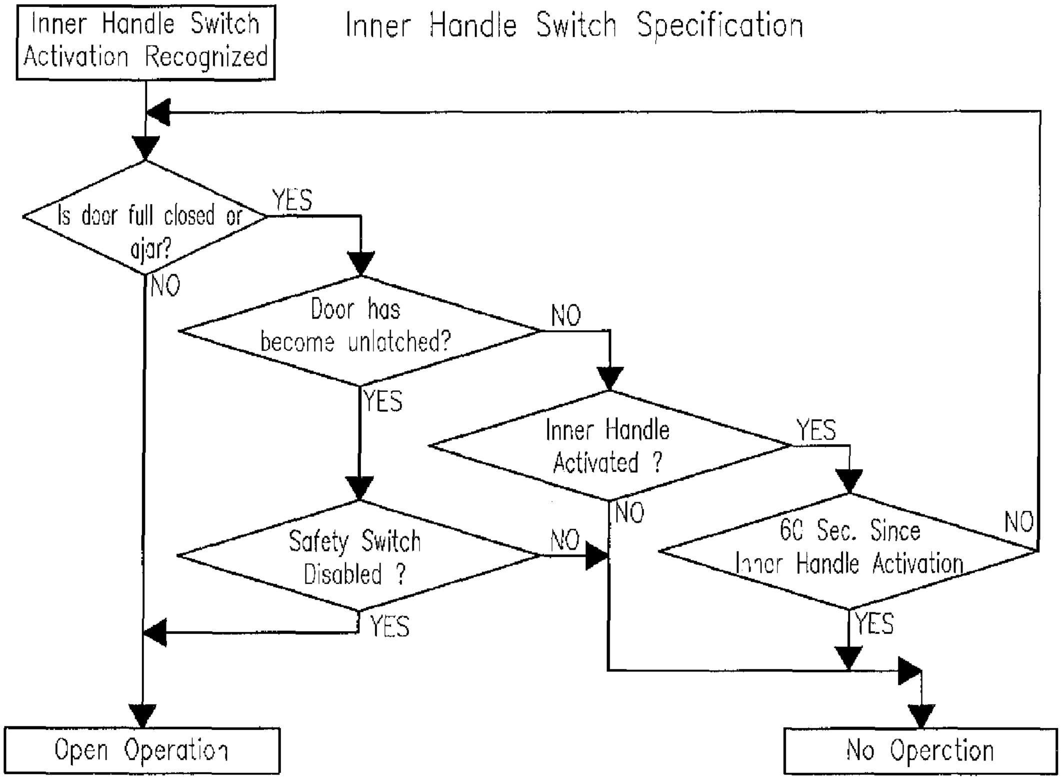
FIG. 4 is a flow chart illustrating the operation of an inner handle switch.

The power door assembly 102 further includes a sliding door 104, a first (or front) latch 106, a second (or rear) latch 108, an inner handle 110, an inner handle switch 112, a rear switch 113, a release actuator 114, and a drive unit 116. The front 106 and rear 108 latches latch the sliding door 104 in a closed position. When activated, the inner handle 110 disengages a front portion of the sliding door 104 from the front latch 106 and a rear portion of the sliding door 104 from the rear latch 108 to thereby allow the sliding door to move from the closed position to an opened position. The sliding door 104 can be opened with the inner handle 110 either manually or automatically via the drive unit 116. Similarly, the sliding door 104 can be closed with the inner handle 110 either manually or automatically via the drive unit 116. To open the sliding door 104 with the inner handle 110 automatically via the drive unit 116, the user simply moves the inner handle 112 in a rearward direction. The motion of the inner handle 112 activates the inner handle switch 112. The inner handle switch 112 in turn actuates the release actuator 114 via the ECU 120. The release actuator 114 releases the sliding door 104 from both the front latch 106 and the rear latch 108 to thereby allow the drive unit 116, via the ECU 120, to open the sliding door 104, see FIG. 4. To close the sliding door 104 with inner handle 110 via the drive unit 116 the user moves the inner handle 112 in a forward direction and the sliding door 104 closes in a similar fashion.

Figure 5:
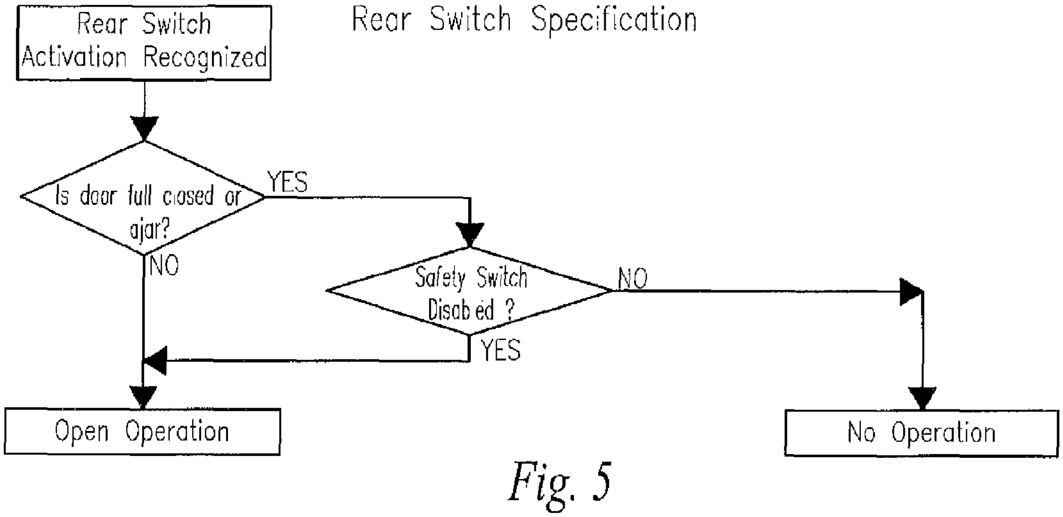
FIG. 5 is a flow chart illustrating the operation of a rear switch.

The rear switch 113 may be located in any location in the second row seating area. Some locations may include in the B-pillar, on an interior of the sliding door 110, on a rear portion of a front floor console, on a rear portion of a ceiling console, etc. When activated, the rear switch 113 actuates the release actuator 114 via the ECU 120. The release actuator 114 releases the sliding door 104 from both the front latch 106 and the rear latch 108 to thereby allow the drive unit 116, via the ECU 120, to open the sliding door 104, see FIG. 5. To close the sliding door 104, the user activates the rear switch 113, which sends a signal to the ECU 120 to close the sliding door 104 via the drive unit 116 in a similar fashion.

Figure 2A:
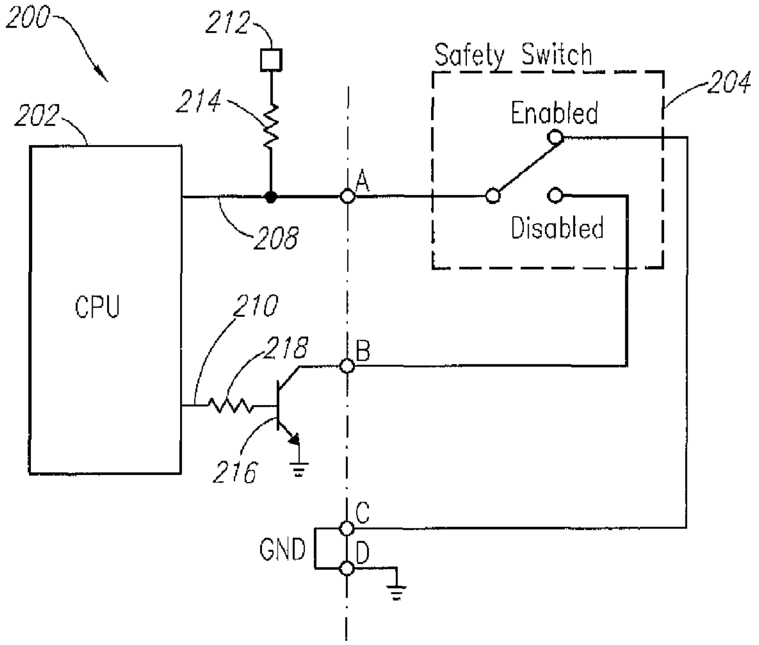
FIG. 2A is an example embodiment in schematic form of the power door safety locking system of FIG. 1.

Referring to FIG. 2A, FIG. 2A schematically shows an example embodiment of the safety locking system 200 in the form of an electrical circuit. The safety locking system 200 includes, a central processing unit (CPU) 202, a safety switch 204, a mechanical safety lock 206 (shown in FIG. 1), a pull-up power source 212, and a switching element 216, such as but not limited to a transistor.

The CPU 202 has an input 208 and an output 210. The input 208, which is electrically connected to the safety switch 204, is electrically connected to the pull-up power source 212 via a resistive element 214. The output 210, which is also electrically connected to the safety switch 204, is electrically connected to the switching element 216 via a resistive element 218.

The safety switch 204 is an electronic component that has an enabled state and a disabled state. When the safety switch 204 is in the enabled state the safety switch 204 is electrically connected to ground. In the enabled state because the safety switch 204 is electrically connected to ground, the pull-up power source 212 is also connected to ground. Thus, the signal seen at the input 208 of the CPU 202 is a low signal thereby confirming that the safety switch 204 is in the enabled state, see FIG. 2B number 242.

Figure 2B:
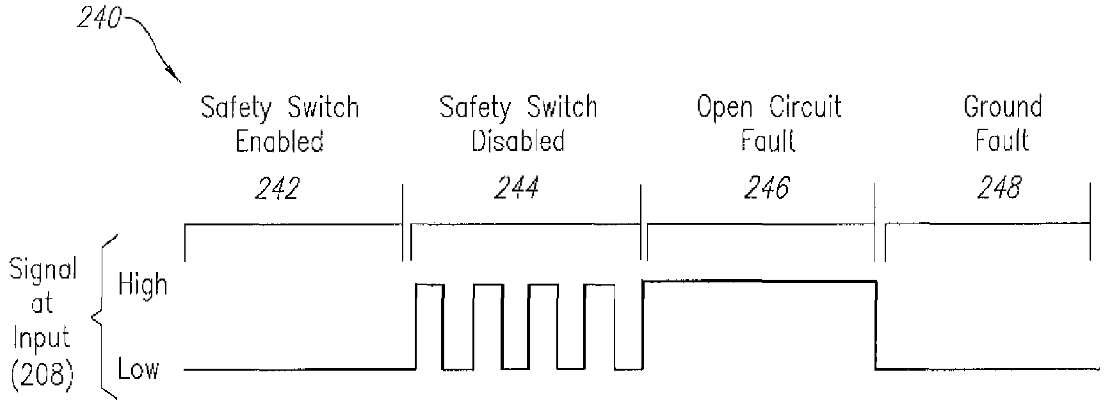
FIG. 2B is an input state diagram of the example embodiment of FIG. 2A.
Figure 2C:
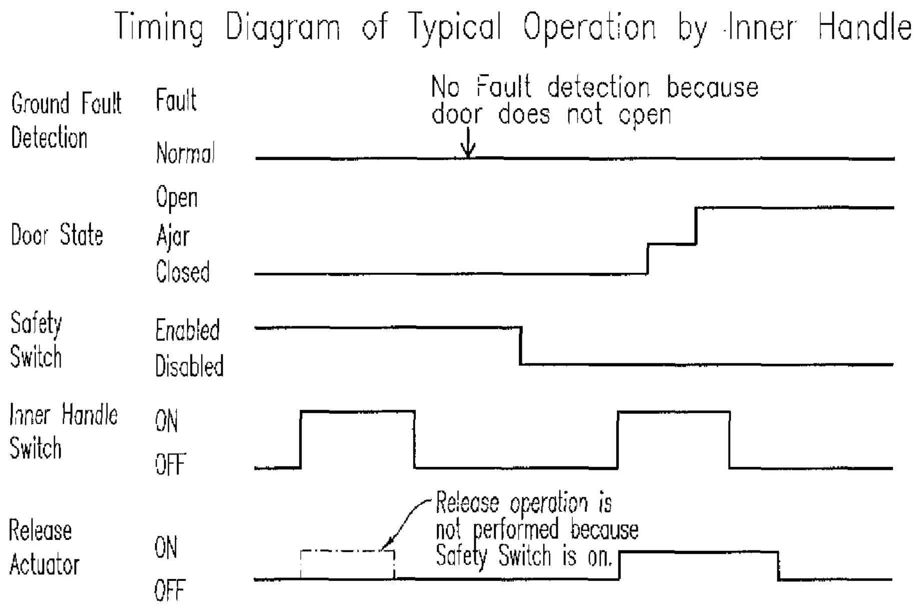
FIG. 2C is a timing diagram of the example embodiment of FIG. 2A.

Referring to the timing diagram in FIG. 2C, during normal operation when the safety switch 204 is enabled, and either the inner handle switch 112 or the rear switch 113 is activated prompting the sliding door 104 to open, the ECU 120 will not activate the release actuator 114. Thus, the sliding door 104 is prevented from moving, via the drive unit 116, from a closed position to an open position. It should be noted, however, that the sliding door 104 can be opened manually or opened via the drive unit 116 once the sliding door 104 is manually disengaged from the front 106 and rear latch 108.

When the safety switch 204 is in the disabled state, the safety switch 204 is electrically connected to the output 210 of the CPU 202 via the switching element 216 thereby providing a circuit connection between the input 208 and the output 210 of the CPU 202. The CPU 202 generates an output pulsed signal, which oscillates the switching element 216 between an "ON" state and an "OFF" state. When the switching element is in the "ON" state, the signal seen at the input 208 is "HIGH" due to the pull-up power source 212. Conversely, when the switching element is in the "OFF" state, the signal seen at the input 208 is "LOW" because the pull-up power source 212 is electrically connected to ground through the switching element 216. Thus, when the safety switch 204 is in the disabled state, the input 208 of the CPU 202 receives a series of "HIGH/LOW" signals thereby confirming that the safety switch 204 is in the disabled state, see FIG. 2B number 244.

Referring to the timing diagram in FIG. 2C, during normal operation when the safety switch 204 is disabled, and either the inner handle switch 112 or the rear switch 113 is activated prompting the sliding door 104 to open, the ECU 120 activates the release actuator 114 thereby allowing the drive unit 116 to move the sliding door 104 from a closed position to an open position (see FIG. 2E), as along as the mechanical safety lock 206 is in a disengaged state, as described below.

The mechanical safety lock 206 is a mechanical device that may be located in the sliding door 104. It should be noted, however, that the mechanical safety lock 206 can refer to substantially any type of lock that is placed at any location within the vehicle 100.

The user manually operates the mechanical safety lock 206 to move the mechanical safety lock 204 between an engaged state and a disengaged state. When the mechanical safety lock 206 is engaged, the inner handle 110 is mechanically decoupled from releasing the front latch 106 and the rear latch 108. Thus, the sliding door 104 cannot move, either manually or via the drive unit 116, from a fully closed position or an ajar position to an open position regardless if the inner handle 110 or rear switch 113 is actuated or regardless of the state of the safety switch 204, see FIG. 2E. Ajar position means that the sliding door 104 is not fully closed but is still engaged with the front latch 106 and/or rear latch 108. The sliding door 104, however, may still move from an open or partially open position to a closed position. When the mechanical safety lock 206 is in the disengaged state the sliding door 104 can move, ether manually or via the drive unit 116, from the closed or ajar position to an open position and vice versa, see FIG. 2E.

As mentioned above, if a known safety locking mechanism experiences an open or ground fault then an undesirable operation of the sliding door can occur. The safety locking system 200 disclosed herein ensures proper detection of an open or ground fault, as will be subsequently described.

Referring to FIGS. 2A and 2B, an open fault can be detected when an open circuit condition exists for a period of time longer than a predetermined threshold time period, For example, as mentioned above, when the safety switch 204 is in the enabled state, the signal seen at the input 208 of the CPU 202 is a low signal. Further, when the safety switch 204 is in the disabled state, the input 208 of the CPU 202 receives a series of "HIGH/LOW" signals indicating that the safety switch 204 is in the disabled state. Thus, in either the enabled or disabled state, during normal operation, the signal seen at the input 208 of the CPU 202 is either a low signal or a pulsed signal oscillating between the high signal and the low signal. When the safety switch 204 is in the enabled state and an open circuit occurs at points A, C, or D, or when the safety switch 204 is in the disabled state and an open circuit occurs at points A or B, the signal seen at the input 208 remains high for a time period that exceeds the threshold time period due to the pull-up power source 212 (FIG. 2B, number 246). Therefore, because the signal remains high for a period of time that exceeds the threshold time period, the CPU 202 of the safety locking system 200 determines that an open circuit condition exists. Thus, the driver is alerted either visually or audibly that an open circuit exists and that the safety switch 204 may not operate properly.

In this open fault condition, the safety locking system 200 will operate as if the safety switch 204 is in the enabled state so as to prevent an inadvertent opening of the sliding door 104. Thus, the sliding door 104 will not operate if either the inner handle switch 112 or the rear switch 113 is activated. In other words, the sliding door 104 will not operate automatically via the drive unit 116. It should be noted, however, that the sliding door 104 can be opened manually with the inner handle 110. Further, the sliding door 104 can be automatically opened via the drive unit 116 once the sliding door 104 is manually disengaged from the front 106 and rear latch 108 by cycling the inner handle 110 to disengage the sliding door 104 from the front 106 and rear 108 latch (see FIG. 2E), as along as the mechanical safety lock 206 is in a disengaged state, as described above.

Figure 2D:
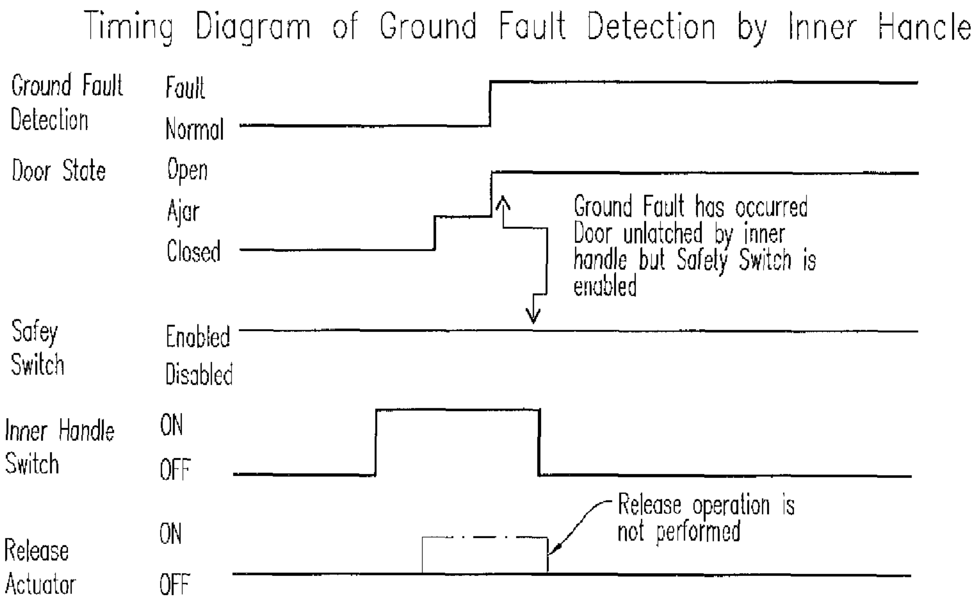
FIG. 2D is a ground fault timing diagram of the example embodiment of FIG. 2A.

Referring to FIGS. 2A, 2B, and 2D, detection of a ground fault in the safety locking system 200 is more complex than detecting an open fault. This is because when the safety switch 204 is connected to ground, the safety switch 204 is enabled thereby disabling the release actuator 114. Thus, the signal seen at the input 208 is low, see 248 in FIG. 2B, because the pull-up power source 212 is also connected to ground. Similarly, when a ground fault occurs, the pull-up power source 212 is grounded due to the fault, and again the signal seen at the input 208 is low. This is important because if the signal at the input 208 is low (via proper enablement of the safety switch or by a ground fault) the safety switch 204 would normally be enabled, which would disable the release actuator 114 and prevent the sliding door 104 from opening if activated. Thus, under a ground fault condition a passenger could be trapped inside the vehicle when in fact the sliding door 104 should open. The safety locking system 200, thus, must discern between a proper safety switch 204 enabled condition and a ground fault condition when either the inner handle switch 112 or the rear switch 113 is activated, In order to detect a ground fault of the safety locking system 200 when the inner handle switch 112 is activated, the CPU 202 recognizes that the safety switch 204 is enabled and should, therefore, disable the release actuator 114. When the mechanical safety lock 206 is engaged, as mentioned above, the inner handle 110 is mechanically decoupled from releasing the front latch 106 and rear latch 108. Therefore, if the operation of the release actuator 114 is prohibited while the mechanical safety lock 206 is engaged and operation of the inner handle 110, as detected by the inner handle switch 112, results in the release of the door 104, then a ground fault is recognized. The reason that a ground fault is recognized is because if the safety switch 204 is truly enabled, the mechanical safety lock 206 will prevent the sliding door 104 from opening.

It should be noted that under a ground fault condition, if the rear switch 113 is activated the safety switch 204 will default to the disabled state. Thus, under a ground fault condition, if the rear switch 113 is activated the sliding door 104 will not open.

Figure 3A:
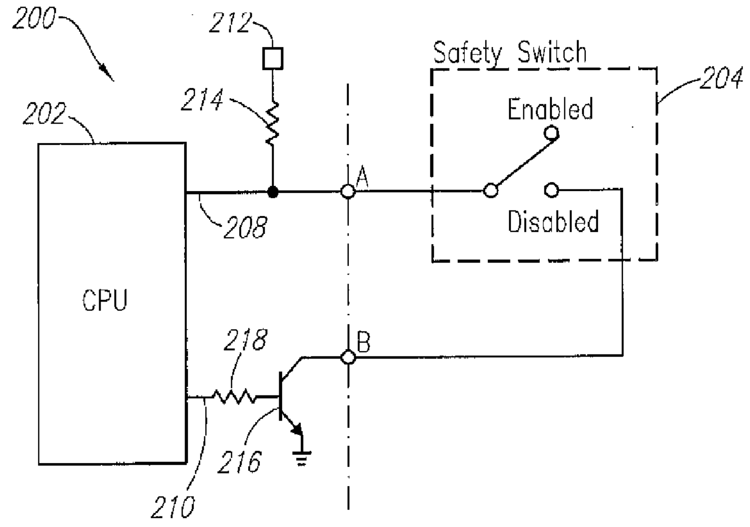
FIG. 3A is another example embodiment in schematic form of the power door safety locking system of FIG. 1.

Referring to FIG. 3A, FIG. 3A schematically shows another example embodiment of the safety locking system 200 in the form of a circuit. The circuit configuration in this embodiment is similar to the embodiment shown in FIG. 2A, thus, the same reference numbers will be used to identify like components and a detailed description of such components will be omitted.

The difference between this embodiment and the embodiment shown in FIG. 2A is that when the safety switch 204 is in the enabled state, the circuit 200 is essentially an open circuit. Thus, when the safety switch 204 is in the enabled state the signal seen at the input 208 is a high signal due to the pull-up power source 212, see FIG. 3B number 242. Normal operation of the safety locking system 200 when the safety switch 204 in the enabled state, however, is identical to the operation described above and will not be repeated. Further, the configuration of the circuit 200 and normal operation of the safety locking system 200 when the safety switch 204 in the disabled state is identical to the configuration and operation described above and will not be repeated.

Another difference between this embodiment and the embodiment shown in FIG. 2A is that in this embodiment a ground fault is easily detectable, whereas in the embodiment shown in FIG. 2A an open fault is easily detectable.

Figure 3B:
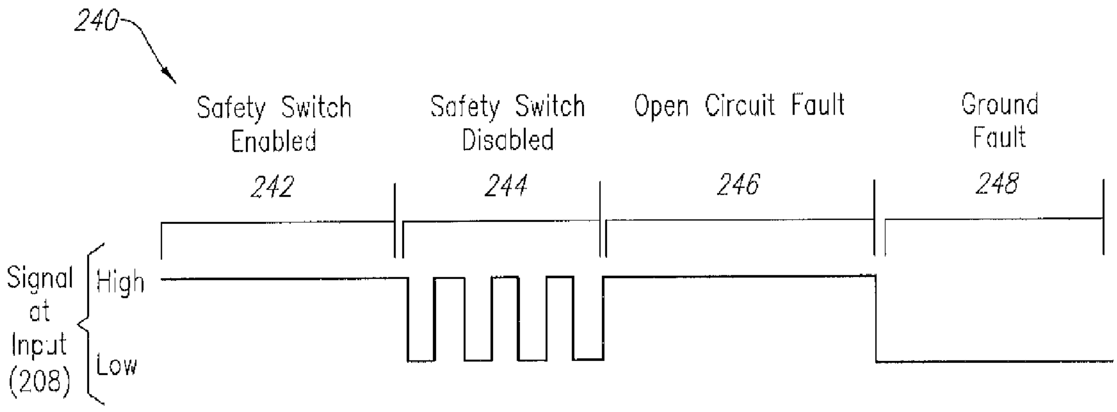
FIG. 3B is an input state diagram of the example embodiment of FIG. 3A.

Referring to FIGS. 3A and 3B, a ground fault can be detected when a short circuit condition (ground fault) exists for a period of time longer than a predetermined threshold time period. For example, as mentioned above, when the safety switch 204 is in the enabled state the circuit 200 is an open circuit. As a result, the signal seen at the input 208 is a high signal due to the pull-up power source 212. Further, as described above, when the safety switch 204 is in the disabled state, the input of the CPU 202 receives a series of "HIGH/LOW" signals indicating that the safety switch is in the disabled state. Thus, in either the enabled or disabled state, during normal operation, the signal seen at the input 208 of the CPU 202 is either a high signal or a pulsed signal oscillating between the high. signal and the low signal. When the safety switch 204 is in the enabled state and a short circuit occurs in the circuit at point A, or when the safety switch 204 is in the disabled state and a short circuit occurs at points A or B, the signal seen at the input 208 remains low for a time period that exceeds the threshold time because the pull-up power source 212 is shorted to ground, see FIG. 3B number 248. Therefore, because the signal remains low for a period of time that exceeds the threshold time period, the CPU 202 of the safety locking system 200 determines that a short circuit condition exists. Thus, the driver is alerted either visually and/or audibly that a short circuit condition exists and the safety switch 204 may not operate properly.

In this ground fault condition, the safety locking system 200 will operate as if the safety switch 204 is in the enabled state. Thus, the sliding door 104 will not operate if either the inner handle switch 112 or the rear switch 113 is activated. In other words, the sliding door 104 will not operate automatically via the drive unit 116. It should be noted, however, that the sliding door 104 can be opened manually with the inner handle 110. Further, the sliding door 104 can be electrically opened via the drive unit 116 once the sliding door 104 is manually disengaged from the front 106 and rear latch 108 by cycling the inner handle 110 to disengage the sliding door 104 from the front 106 and rear 108 latch (see FIG. 2E), as along as the mechanical safety lock 206 is in a disengaged state, as described above.

Still referring to FIGS. 3A and 3B, in this embodiment detection of an open fault in the safety locking system 200 is more complex than detecting a ground fault. This is because when the safety switch 204 is open, the safety switch 204 is in the enabled state thereby disabling the release actuator 114. Thus, the signal seen at the input 208 is high, see FIG. 3B number 246, due to the pull-up power source 212. Similarly, when an open fault occurs, the pull-up power source 212 forces the signal seen at the input 208 to high. This is important because if the signal at the input 208 is high (via proper enablement of the safety switch or by an open fault) the safety switch 204 would normally be enabled, which would disable the release actuator 114 and prevent the sliding door 104 from opening if activated. Thus, under an open fault condition a passenger could be trapped inside the vehicle when in fact the sliding door 104 should open. The safety locking system 200, thus, must discern between a proper safety switch 204 enabled condition and an open fault condition when either the inner handle switch 112 or the rear switch is activated.

In order to detect an open fault of the safety switch 204 when the inner handle switch 112 is activated, the CPU recognizes that the safety switch 204 is enabled and, therefore, disables the release actuator 114. When the mechanical safety lock 206 is engaged, as mentioned above, the inner handle 110 is mechanically decoupled from releasing the front latch 106 and rear latch 108. Therefore, if the operation of the release actuator 114 operation is prohibited while the mechanical safety lock 206 is engaged and operation of the inner handle 110, as detected by the inner handle switch 112, results in the release of the sliding door 104, then an open fault is recognized. The reason that an open fault is recognized is because if the safety switch 204 is truly enabled, the mechanical safety lock 206 will prevent the sliding door 104 from opening.

It should be noted that under an open fault condition, if the rear switch 113 is activated the safety switch 204 will default to the disabled state. Thus, under an open fault condition, if the rear switch 113 is activated the sliding door will not open.

It will be appreciated that some or all of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A safety locking system comprising:
- a central processing unit having an input and an output, the input to receive a low signal, a high signal, or a pulsed signal oscillating between the low signal and the high signal; and
- a safety switch electrically connected to the input of the central processing unit, the safety switch having an enabled state and a disabled state,
- wherein the input receives the low signal when the safety switch is in the enabled state,
- wherein the input receives the pulsed signal when the safety switch is in the disabled state,
- wherein the central processing unit detects an open fault condition when the input receives the high signal for a time period greater than a threshold time period, and
- wherein the central processing unit detects a ground fault condition when the input receives the low signal and the safety switch operates as if the safety switch is in the disabled state.

2. The safety locking system of claim 1 further comprising a switching element electrically connected to the output of the central processing unit and to the safety switch, wherein the output of the central processing unit generates an output pulsed signal to oscillate the switching element between an "ON" state and an "OFF" state.

3. The safety locking system of claim 2 further comprising a power source electrically connected to the input of the central processing unit and to the safety switch, wherein when the safety switch is in the enabled state, the safety switch and the power source are electrically connected to ground, and when the safety switch is in the disabled state, the safety switch and the power source are electrically connected to the switching element.

4. The safety locking system of claim 3 further comprising a mechanical safety lock, the mechanical safety lock having an engaged state and a disengaged state, wherein when the mechanical safety lock is in the engaged state, the mechanical safety lock prevents the operation of the safety switch when the safety switch is in the disabled state.

5. A power door assembly for a vehicle comprising:
- a power door;
- a first latch to latch the power door in a closed position;
- an inner handle to manually disengage the first latch;
- an inner handle switch activated by the inner handle to electrically disengage the power door from the first latch;
- a rear switch to electrically disengage the power door from the first latch when activated; and
- a safety locking system, the safety locking system including:
  - a central processing unit having an input and an output, the input to receive a low signal, a high signal, or a pulsed signal oscillating between the low signal and the high signal; and
  - a safety switch electrically connected to the input of the central processing unit, the safety switch having an enabled state and a disabled state,
  - wherein the input receives the low signal when the safety switch is in the enabled state,
  - wherein the input receives the pulsed signal when the safety switch is in the disabled state,
  - wherein the central processing unit detects an open fault condition when the input receives the high signal for a time period greater than a threshold time period, and
  - wherein the central processing unit detects a ground fault condition when the input receives the low signal and the power door moves from the closed position to an open position when the inner handle switch is activated.

6. The power door assembly of claim 5, wherein when the safety switch is in the enabled state, the power door is prevented from moving from the closed position to the open position when the inner handle switch or the rear switch is activated, and wherein when the safety switch is in the disabled state, the power door is permitted to move from the closed position to the open position when the inner handle switch or the rear switch is activated.

7. The power door assembly of claim 6 further comprising a release actuator to release the first latch when the inner handle switch or the rear switch is activated.

8. The power door assembly of claim 7 further comprising a drive unit to electrically open or close the power door when activated by the inner handle switch or the rear switch.

9. The power door assembly of claim 5, wherein the safety locking system further includes a switching element electrically connected to the output of the central processing unit and to the safety switch, wherein the output of the central processing unit generates an output pulsed signal to oscillate the switching element between an "ON" state and an "OFF" state.

10. The power door assembly of claim 9, wherein the safety locking system further includes a power source electrically connected to the input of the central processing unit and to the safety switch, and wherein when the safety switch is in the enabled state, the safety switch and the power source are electrically connected to ground and when the safety switch is in the disabled state the safety switch and the power source are electrically connected to the switching element.

11. The power door assembly of claim 10, wherein the safety locking system further includes a mechanical safety lock, the mechanical safety lock having an engaged state and a disengaged state, wherein when the mechanical safety lock is in the engaged state, the mechanical safety lock decouples the inner handle from releasing the first latch to thereby prevent the opening of the power door when the safety switch in the disabled state.

12. The power door assembly of claim 11 further comprising a second latch, wherein the power door is a sliding door, and wherein the first latch is a front latch to latch a front portion of the sliding door and the second latch is a rear latch to latch a rear portion of the sliding door.

13. A method of detecting a fault condition of a safety switch of a safety locking system for a vehicle power door assembly via a central processing unit associated with the safety locking system, the safety switch having an enabled condition wherein the power door is prevented from moving from a closed position to an open position and a disabled condition wherein the power door is not prevented from moving from the closed position to the open position, the method comprising:

- detecting a low signal via the central processing unit when the safety switch is in the enabled condition at an input of the central processing unit;
- detecting a pulsed signal via the central processing unit when the safety switch is in the disabled condition at the input of the central processing unit;
- detecting an open fault condition in the safety locking system via the central processing unit by detecting a high signal at the input of the central processing unit for a time period longer than a threshold time period; and
- detecting a ground fault condition in the safety locking system via the central processing unit by detecting a low signal at the input of the central processing unit when the power door is moved from the closed position to the open position.

14. The method of claim 13, wherein prior to detecting the pulsed signal when the safety switch is disabled at the input of the central processing unit of the safety locking system, the method further comprises:

- generating a pulsed output via the central processing unit at an output of the central processing unit; and
- switching a switching element of the safety locking system between an "ON" state and an "OFF" state to generate the pulsed signal detected at the input of the central processing unit,
- wherein the pulsed signal oscillates between the low signal and the high signal.

15. The method of claim 14, further including activating an inner handle switch or a rear switch of the power door assembly, and wherein after activating the inner handle switch or the rear switch of the power door assembly, the method further comprises activating a release actuator of the power door assembly to release a first latch of the power door assembly when the safety switch is disabled to move the power door from the closed position to the open position.

16. The method of claim 15, wherein prior to moving the power door from the closed position to the open position if the safety switch is disabled, the method further comprises activating a drive unit of the power door assembly.

17. The method of claim 16, wherein the power door is a sliding door and wherein activating the release actuator of the power door assembly to release the first latch of the power door assembly when the safety switch is disabled to move the power door from the closed position to the open position comprises:

- releasing the first latch to release a front portion of the sliding door; and
- releasing a second latch of the power door assembly to release a rear portion of the sliding door.

18. The method of claim 17, wherein prior to activating an inner handle switch, the method further comprises rotating an inner handle of the power door assembly in a rearward direction.

* * * * *